United States Patent [19]

Kober

[11] 4,098,258

[45] Jul. 4, 1978

[54] COMPLEX ELECTROCHEMICAL HEATING ELEMENT

[75] Inventor: Frederick P. Kober, Bayside, N.Y.

[73] Assignee: Chem-E-Watt Corp., Racine, Wis.

[21] Appl. No.: 743,438

[22] Filed: Nov. 19, 1976

[51] Int. Cl.² .......................... F24J 1/00; H01M 2/24

[52] U.S. Cl. .......................... 126/263; 429/8

[58] Field of Search .................... 429/8, 120; 126/263; 219/201, 209, 240, 224; 204/248, 197

[56] References Cited

U.S. PATENT DOCUMENTS

| | | | |
|---|---|---|---|
| 3,207,149 | 9/1965 | Spindler | 126/263 |
| 3,774,589 | 11/1973 | Kober | 429/120 |
| 3,884,216 | 5/1975 | McCartney | 126/263 |
| 3,920,476 | 11/1975 | Black et al. | 126/263 |
| 3,942,511 | 3/1976 | Black et al. | 126/263 |

*Primary Examiner*—Donald L. Walton

[57] ABSTRACT

A complex electrochemical heat-generating element characterized by a two-surfaced anode layer, two separator layers of porous, absorbent material, one on either surface of the anode layer, two cathode layers, one in contact with each of the separator layers, and electrically conductive connectors extending through the cathode layers, separator layers and anode layer to conduct an electric heating current between the anode and cathode layers. Preferred embodiments relate to specific arrangements of connectors.

6 Claims, 3 Drawing Figures

COMPLEX ELECTROCHEMICAL HEATING ELEMENT

BACKGROUND OF THE INVENTION

This invention relates to a means for generating heat by way of an electrochemical reaction, and, more specifically, to a means for sustaining an electrochemical reaction in a heating element at high rates for extended periods of time.

The prior art as taught by Kober (U.S. Pat. No. 3,774,589) describes an electrochemical heater construction having an anode structure and cathode structure and a suitable porous, highly absorbent separator means situated therebetween, the electrode structures being connected one to another internally by electrically conductive short circuiting members. Introduction of a suitable electrolyte into this construction initiates an electrochemical heat-producing reaction.

It has been shown on theoretical grounds that this heater construction results in efficiencies of energy conversion, (that is, the conversion of the chemical energy inherent in the electrochemically active materials to thermal energy) approaching 100%. However, in practice, although the energy conversion reaction proceeds at an efficiency approaching 100%, utilization of the electrochemically active materials is well below this value. Only a small percentage of the active material available for reaction is actually utilized. Stated differently, the construction taught by Kober in U.S. Pat. No. 3,774,589 is not capable of sustaining the electrochemical reaction at high rates until the active materials have been completely exhausted. An important practical limitation resulting from the limited electrochemical reaction is that excess active materials must be part of the heater construction, thus adding considerably to the size and cost of the heater for practical applications.

The electrochemical heater design of this invention, which places two cathode structures about a single anode, not only permits the high rate (high current with minimal polarization) generation of heat, but also allows the electrochemical reaction to sustain itself substantially until the exhaustion of the active material, within the limits of practicality.

BRIEF SUMMARY OF THE INVENTION

The present invention differs markedly in design from electrochemical heating elements of the prior art, including the heater previously taught by Kober, and results in minimizing or elimination of the aforementioned limitations inherent in electrochemical heating elements of the prior art. The electrochemical heater disclosed in the present invention includes a single electrochemically active anode structure positioned between two electrochemically active cathode structures. The cathode structures are further separated from the anode by means of a bibulous, porous, highly absorbent material. This entire sandwich structure, including two cathodes, two separator layers and a single anode structure in the center, is fastened together by means of electrically conductive short-circuiting connector members extending therethrough.

In certain embodiments, the connector means is a number of connectors at least one and normally several of which connect the anode and one adjacent set of a cathode and separator to form a subassembly which is then joined to another set of a cathode and separator.

Such embodiments substantially enhance the performance of the "complex element" of this invention.

With the five-layered electrochemical heating element of this invention, the rate of heat generation per unit time can be maximized and sustained over extended periods of time. This allows maximum utilization of the electrochemically active materials, resulting in substantial economics of heater construction. The significant improvements in heat output will be apparent from the experimental data presented hereinafter. Such improvements could not have been anticipated or predicted a priori.

Another important advantage of this invention is that the total heat density, that is, heat generated per unit area of heater, can be substantially improved over heater constructions of the prior art. This advantage is of special importance in those practical applications in which the area available for the heater is at a premium, but maximum heat generation is required. Other advantages and benefits derived from the present invention will become apparent hereinafter.

OBJECTS OF THE INVENTION

One object of this invention is to provide an electrochemical heating element in which the rate of heat generation per unit time is maximized.

Another object of this invention is to provide an electrochemical heating element in which heat generation at a high level is sustained over extended periods of time.

Another important object of this invention is to provide an electrochemical heating element in which there is a high utilization of electrochemically active materials.

Yet another object of this invention is to provide an electrochemical heating element which has a high heat density, that is, a high level of heat generation per unit area of the element.

These and other important objects of the invention will be apparent from the following description of preferred embodiments and the discussion relating thereto.

DETAILED DESCRIPTION OF PREFERRED EMBODIMENTS

Figure 1:
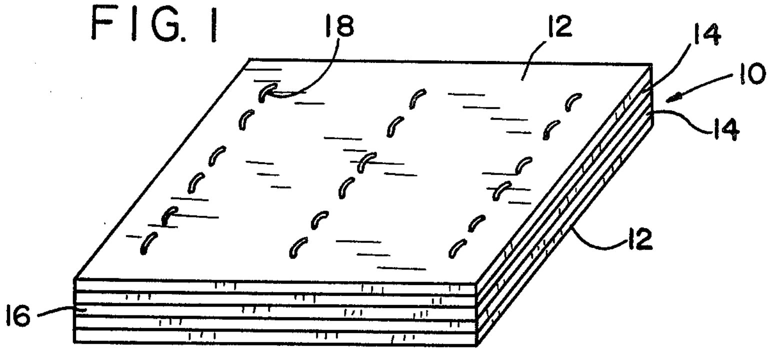
FIG. 1 is a perspective view of one embodiment of the electrochemical heating element of this invention.

In the drawings, showing different preferred embodiments of this invention, like numerals are used to designate like parts.

FIG. 1 is a perspective view showing a complex electrochemical heating element 10 according to this invention. Element 10 has five layers including two outer cathode layers 12, adjacent separator layers 14, and a center anode layer 16. Each layer is in intimate contact at its surface with the surface of the adjacent layers, this holding true for both surfaces of the separator layers 14 and the anode layer 16.

Cathode layers 12 are of an electrochemically active, nonmetallic, reducible substance which is conductive. Cathode layers 12 need not be formed of a reducible substance but may provide an electrochemically active surface upon which another material, for example, oxygen on an activated carbon-air electrode, is reduced. Cathode materials may be formed of a wide variety of substances such as manganese dioxide, metadinitrobenzene, silver chloride, silver oxide, copper fluoride, copper chloride and air depolarized cathode structures of the carbon and metal type.

The material for anode layer 16 can be selected from those metals and alloys which are known to be electrochemically active, for example, zinc, aluminum, magnesium, cadmium, lead, or alloys thereof. Anodes of aluminum and magnesium or their more common alloys are preferred because of their high inherent energy content and lack of concern for toxicity. The anode structure can take the form of thin metallic sheets or foils, powders, chips, granules or turnings pressed or rolled into a suitable conductive plate.

Separator layers 14 are formed of a non-conductive, porous, absorbent material such as cotton, felt, or bibulous papers, which enable ions of an electrolyte to freely pass between the anode layer and the cathode layers. The separator material is sized to absorb and hold a sufficient amount of electrolyte solution to sustain the high rate electrochemical reaction to completion.

An electrolyte formed of an ionically conductive medium is placed within separator layers 14. The electrolyte may be an aqueous salt solution such as table salt (NaCl), or may be selected from a host of many well known other electrolyte materials. In those applications for which extremely high heat output is essential, highly acid or alkaline electrolytes can be used to great advantage. For example, water can be used in combination with a lithium metal anode, the electrolyte being lithium hydroxide which is produced spontaneously upon contact of the water with the lithium. This extremely high energy reaction could find use where high heat output per unit weight and area of heater is required. However, for the wide range of more common potential applications for the electrochemical heater, electrolytes consisting of an aqueous solution of sodium or magnesium chloride are preferred.

An electrolyte solution may be introduced into separator layers 14 in a number of ways. An electrolyte salt may be contained within the separator material in dry form, which when contacted with water dissolves to form the aqueous electrolyte solution. Alternatively, the dry salt can be intermixed or dispersed within the cathode or anode active materials. In both such cases, the activation of the heater element is by simple introduction of water and subsequent dissolving of the dry salt to form an electrolyte within the separator material. Or, an aqueous electrolyte solution can be used directly for heater activation, that is, without any dry salt contained within the heater structure. Combinations of the above can also be used to good advantage. The placement of dry electrolyte salt within the heater, and activation with water or salt solution is governed by the speed at which it is desired for the reaction to initiate. For example, if salt solution is used for heater activation the electrochemical reaction is initiated essentially instantaneously. On the other hand, if water is used for activation, the dry salt contained within the heater element must first dissolve before the electrochemical reaction can begin generating heat at the desired rate.

Figure 2:
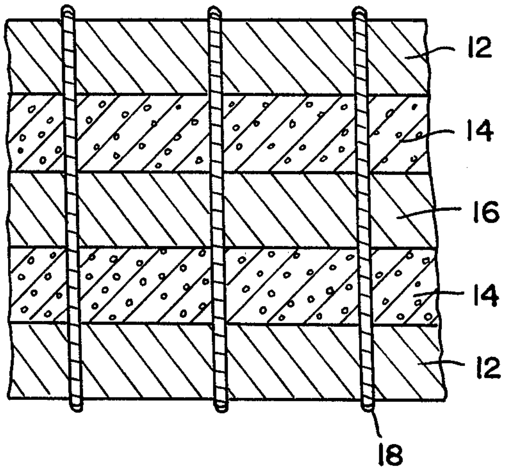
FIG. 2 is a partial sectional view of another embodiment of this invention.
Figure 3:
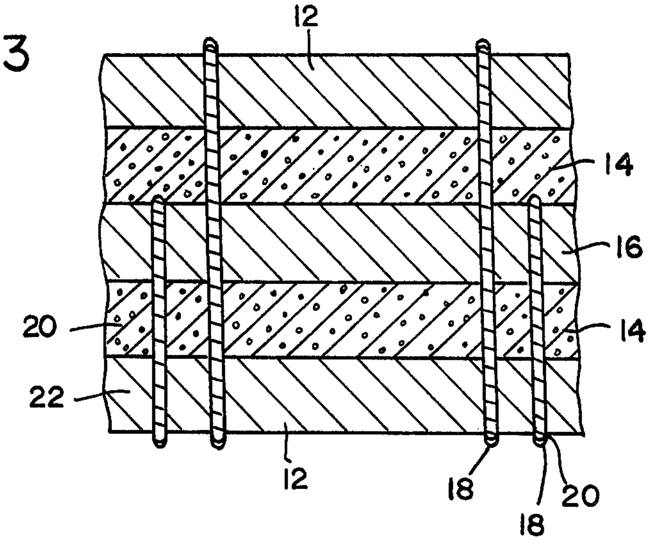
FIG. 3 is a similar partial sectional view of another embodiment of this invention.

As illustrated in FIGS. 2 and 3, electrically conductive connector means 18 extend through the five layered element, electrically connecting the anode layer 16 and the cathode layers 12 through the separator layers 14. Connectors 18 are sized to support the short circuiting current produced when the electrochemical heating element is activated. Connectors 18, which are integrally contained as part of the element, serve a dual purpose: 1) holding the overall heater sandwich structure together — keeping the individual layers in proper juxtaposition to one another, and 2) providing an internal short-circuiting means between the anode and cathode structures. Consequently, the fastening means must be mechanically strong while at the same time being electrically conductive. The fastening means may be selected from metal rivets, metal wire or staples, conductive carbon thread or similar materials. From the standpoint of heater performance, economics and ease of production, metal wire or staples are preferred.

Experimental data was developed to illustrate some of the advantages of this invention. Of the many possible electrochemical heat generating reactions, a manganese dioxide — magnesium reaction was chosen for experimental evaluation. The magnesium was in the form of thin sheets (0.011 inch thick), and the electrolyte was an aqueous solution of sodium chloride. As an initial assessment of the present invention, an element constructed in accordance with FIG. 3 above and containing 1 sq in of magnesium (0.32 g) was compared to a heat-generating element of similar size and construction except made according to the prior art (U.S. Pat. No. 3,774,589). Both elements were activated with 3 cc of 23.3% solution of NaCl. The data are shown below.

| | Peak Element Temp. | Total Time Above 45° C |
|---|---|---|
| Prior Art | 74° C at 6 min. | 22.5 min. |
| Inventive Element | 75° C at 8 min. | 46 min. |

It can be seen that initially both elements generated heat at approximately the same rate, but the heat generating element designed according to the present invention was able to sustain this reaction for better than twice as long. Moreover, this significant improvement in overall performance proved to be readily reproducible.

The electrochemical reaction of a manganese dioxide magnesium system can be represented as $$2\,MnO_2 + Mg + H_2O \rightarrow Mn_2O_3 + Mg(OH)_2$$

This reaction has an open current potential (OCV) of approximately 2.7 V vs. hydrogen. The theoretical heat output, assuming 100% conversion of chemical to thermal energy is given by $$\frac{2 \times 26.8\,A - \text{hrs.}}{\text{g} - \text{mole}}\,(2.7\,V)\,\frac{(860\text{ cal})}{W - \text{hr}} = \frac{124.46\text{ Kcal}}{\text{g} - \text{mole}}$$

$$\frac{124.46\text{ Kcal}}{\text{g} - \text{mole}} = \frac{493.92\text{B BTU}}{\text{g} - \text{mole}}$$

or 20.32 BTU/g of Mg

However, it has been demonstrated that this theoretical value cannot be achieved in practice, and the limit of magnesium utilization in a practical electrochemical element is approximately 70%. (See P. F. King and J. L. Robinson, 2nd Quarterly Report, USAECOM DA 36-039-SC-88912, Dow Chemical Company, Midland, Mich., Jan. 1962). Consequently, the maximum heat output that can be attained in a practical electrochemical heat generating cell is about 14.224 BTU/g of Mg.

With the foregoing theoretical and practical information regarding maximum heat output in mind, additional tests were run using heating elements larger than the aforementioned elements of 1 sq in. In order to demonstrate the practical applicability of the inventive heaters, BTU outputs were measured by heating 142 g of pre-packaged food (beef stew in sauce). The heaters and food packages were placed in a well insulated container to minimize any heat loss to the environment. In each case, the anodes were 12 $in^2$ and 3.96 g in weight. For purposes of these calorimetric calculations the assumption was made that the food had a specific heat of 1.0 cal/g/° C. The comparative data are given below.

| | Total BTU after 20 min. | Mg. Utilization |
|---|---|---|
| Prior Art Element | 16.3 - 25.4 | 28.9 - 45.1% |
| Inventive Element | 25.5 - 32.1 | 45.3 - 57.0% |

(The percent of magnesium utilization is based on the practical utilization limit of 14.224 BTU/g Mg.)

From the above tabulations, the advantages of the present invention as compared to the prior art are manifest. Of particular significance is the very large increase in magnesium utilization which is of considerable economic importance for practical applications. Furthermore, the considerable increase in heat output per unit area of heater is of great advantage in those applications where space available for the heater is quite limited.

The instant invention is useful in a great variety of heating applications, including specialized food heating, body warming and treatment, and the like.

While in the foregoing specification, this invention has been described in relation to certain preferred embodiments, and many details have been set forth for purpose of illustration, it will be apparent to those skilled in the art that the invention is susceptible to additional embodiments and that certain of the details described herein can be varied considerably without departing from the basic principles of the invention.

I claim:

1. An electrochemical heating element comprising:

an anode layer;

two separator layers of porous absorbent material, one on either side of said anode layer and each having an anode-adjacent surface and a cathode-adjacent surface, each of said anode-adjacent surfaces juxtaposed in contact with one side of said anode;

two cathode layers, one on either side of said anode layer and each having a surface juxtaposed in contact with one of said cathode-adjacent surfaces of said separator layers; and a multiplicity of electrically-conductive connector means extending through said anode, separator and cathode layers to conduct an electric heating current between said anode layer and said cathode layers, including at least one connector extending only through said anode layer, one of said separator layers and the adjacent cathode layer.

2. The electrochemical heating element of claim 1 wherein said connector means comprise a multiplicity of connectors extending only through said anode layer, one of said separator layers and the adjacent cathode layer and a multiplicity of connectors extending through all of said anode, separator and cathode layers, said connectors spaced one from another for a uniform heating of the heating element during activation thereof.

3. The electrochemical heating element of claim 1 wherein said anode layer comprises an electrochemically active, electrically conductive, oxidizable material and said cathode layers comprise an electrochemically active, nonmetallic, reducible material.

4. In a sandwich-like electrochemical heating element of the type having an anode layer, a cathode layer, a separator layer of porous, absorbent material between and in contact with said anode and said cathode layers, and a multiplicity of electrically-conductive connectors extending through said layers, the improvement comprising a five-layered structure including, in order, a first cathode layer, a first separator layer, an anode layer, a second separator layer and a second cathode layer at least one of said connectors extending through said five layers and, at least one of said connectors extending only through said anode layer, said first separator layer and said first cathode layer.

5. The improvement of claim 4 wherein said anode layer comprises an electrochemically active, electrically conductive, oxidizable material and said cathode layers comprise an electrochemically active, nonmetallic, reducible material.

6. The electrochemical heating element of claim 4 wherein said connector means comprises a multiplicity of connectors extending only through said anode layer, said first separator layer and said first cathode layer, and a multiplicity of connectors extending through all five of said layers, said connectors spaced one from another for uniform heating of the heating element during activation thereof.

* * * * *

UNITED STATES PATENT OFFICE
CERTIFICATE OF CORRECTION

Patent No. 4,098,258 Dated July 4, 1978

Inventor(s) Frederick P. Kober

It is certified that error appears in the above-identified patent and that said Letters Patent are hereby corrected as shown below:

Column 4, line 56 - Delete "B" after"493.92".

Column 6, line 34 - Insert "," after "layer".

Column 6, line 35 - Delete "," after "and".

Signed and Sealed this

*Sixteenth* Day of *January 1979*

[SEAL]

*Attest:*

RUTH C. MASON
*Attesting Officer*

DONALD W. BANNER
*Commissioner of Patents and Trademarks*